(12) United States Patent
Kinugawa et al.

(10) Patent No.: US 11,209,450 B2
(45) Date of Patent: Dec. 28, 2021

(54) SPECIMEN INSPECTION AUTOMATION SYSTEM

(71) Applicant: HITACHI HIGH-TECHNOLOGIES CORPORATION, Tokyo (JP)

(72) Inventors: Kohei Kinugawa, Tokyo (JP); Katsuhiro Kambara, Tokyo (JP); Toshiki Yamagata, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 485 days.

(21) Appl. No.: 16/087,108

(22) PCT Filed: Jan. 19, 2017

(86) PCT No.: PCT/JP2017/001670
§ 371 (c)(1),
(2) Date: Sep. 21, 2018

(87) PCT Pub. No.: WO2017/168979
PCT Pub. Date: Oct. 5, 2017

(65) Prior Publication Data
US 2019/0101558 A1 Apr. 4, 2019

(30) Foreign Application Priority Data
Mar. 29, 2016 (JP) .............................. JP2016-066248

(51) Int. Cl.
*G01N 35/04* (2006.01)
*G01N 35/02* (2006.01)
*G01N 35/00* (2006.01)

(52) U.S. Cl.
CPC ....... *G01N 35/04* (2013.01); *G01N 35/00584* (2013.01); *G01N 35/02* (2013.01); *G01N 2035/0462* (2013.01)

(58) Field of Classification Search
CPC .. G01N 35/00732; G01N 35/04; G01N 35/02; G01N 35/00584; G01N 2035/0462;
(Continued)

(56) References Cited

U.S. PATENT DOCUMENTS 4,692,308 A * 9/1987 Riley ................... G01N 35/021
422/65
4,877,134 A * 10/1989 Klein ........................ B01L 9/06
206/443
(Continued)

FOREIGN PATENT DOCUMENTS

CN 103154745 A 6/2013
EP 2 896 965 A1 7/2015
(Continued)

OTHER PUBLICATIONS

International Preliminary Report on Patentabiltiy received in corresponding International Application No. PCT/JP2017/001670 dated Oct. 11, 2018.
(Continued)

*Primary Examiner* — Nathaniel J Kolb
(74) *Attorney, Agent, or Firm* — Mattingly & Malur, PC

(57) ABSTRACT

A specimen inspection automation system includes holder orientation adjustment mechanisms that adjust the orientations of specimen container holders that each holds one specimen container. The holder orientation adjustment mechanisms each includes: a stopper mechanism that is disposed above a conveyance line that conveys a specimen container holder and restricts the downstream movement of the specimen container holder by abutting, at the same height as a notched part provided on one side of a base of the specimen container holder, an outer circumferential part other than the notched part in the circumferential direction of the base; and a holder rotation mechanism that restricts the movement of the specimen container holder away from (Continued)

the stopper mechanism and rotates the specimen container holder in the circumferential direction. As a result, it is possible to appropriately adjust the orientation of a specimen container in which a specimen is accommodated and reduce work complexity.

5 Claims, 12 Drawing Sheets

(58) Field of Classification Search
CPC .. G01N 2035/0406; G01N 2035/00752; B01L 9/06
See application file for complete search history.

(56) References Cited

U.S. PATENT DOCUMENTS

| | | | | |
|---|---|---|---|---|
| 5,350,564 | A * | 9/1994 | Mazza | B01L 3/50855 |
| | | | | 422/562 |
| 5,941,366 | A * | 8/1999 | Quinlan | B65G 17/002 |
| | | | | 198/465.1 |
| 2013/0202486 | A1 | 8/2013 | Onizawa et al. | |
| 2014/0294699 | A1 * | 10/2014 | Akutsu | G01N 35/04 |
| | | | | 422/551 |
| 2016/0244269 | A1 * | 8/2016 | Akutsu | G01N 35/026 |
| 2016/0245935 | A1 * | 8/2016 | Hanaya | G01T 7/08 |

FOREIGN PATENT DOCUMENTS

| | | |
|---|---|---|
| JP | 07-239333 A | 9/1995 |
| JP | 2009-123679 A | 6/2009 |
| JP | 2010-271204 A | 12/2010 |
| WO | 2013/099538 A1 | 7/2013 |
| WO | 2015/064540 A1 | 5/2015 |
| WO | 2016/158122 A | 10/2016 |

OTHER PUBLICATIONS

International Search Report of PCT/JP2017/001670 dated Apr. 18, 2017.

Extended European Search Report received in corresponding European Application No. 17773529.7 dated Oct. 25, 2019.

* cited by examiner

[FIG. 1]
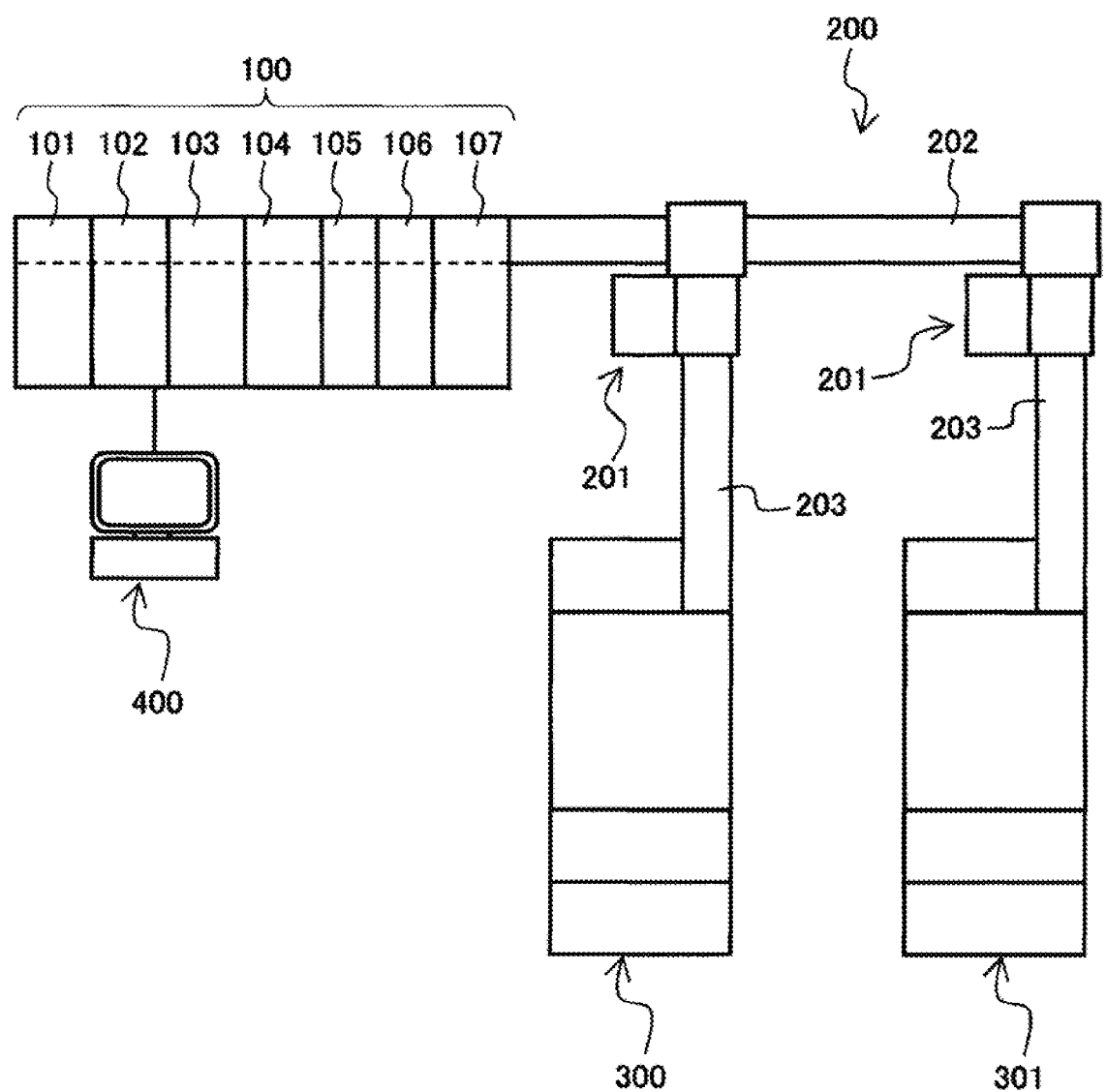

[FIG. 2]
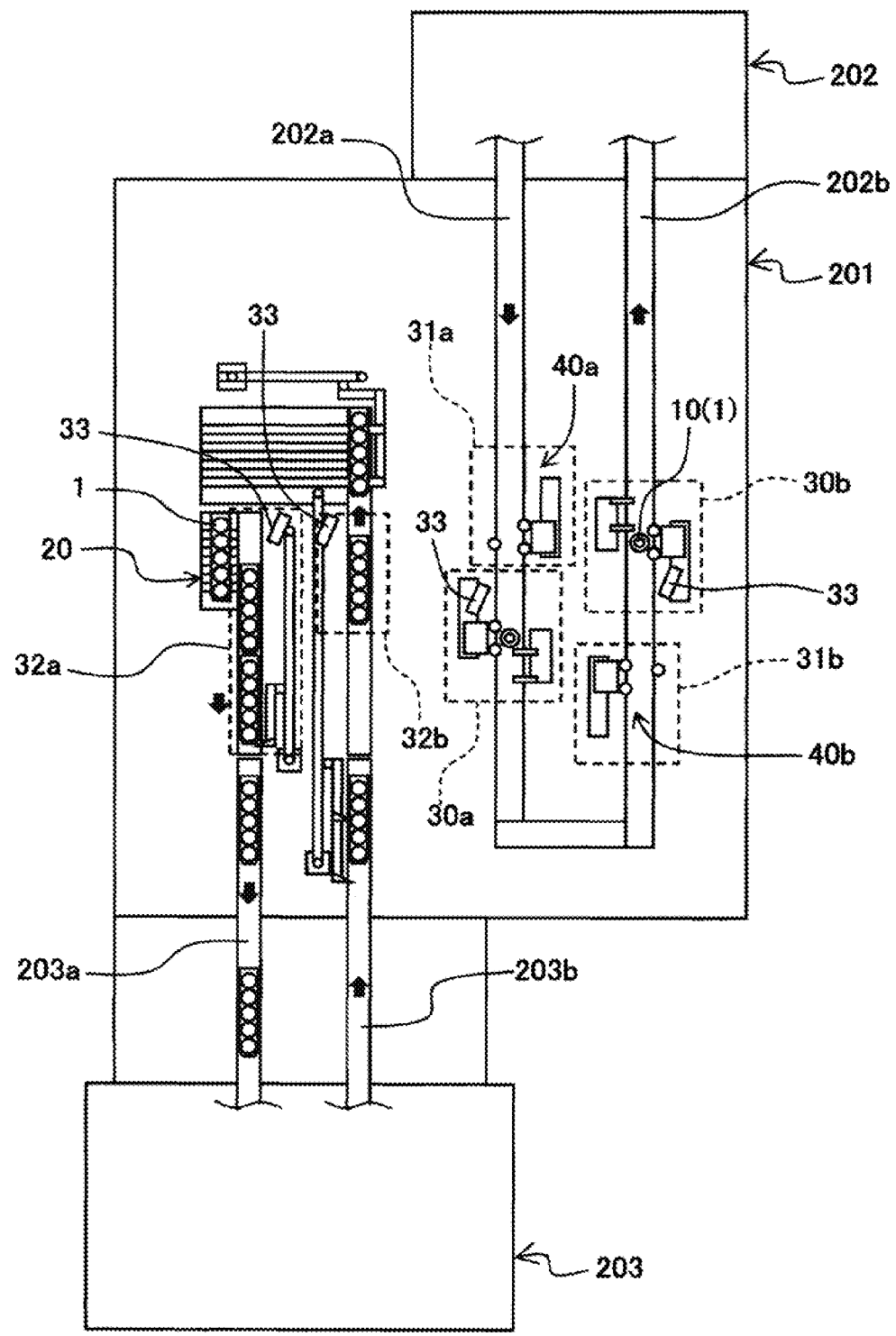

[FIG. 3]
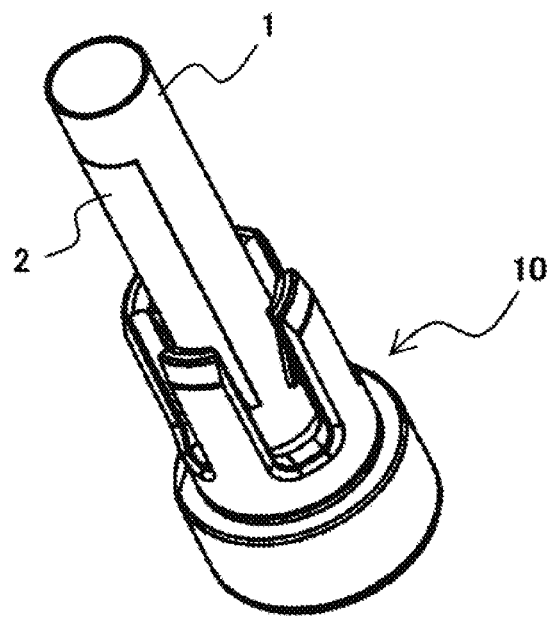
[FIG. 4]
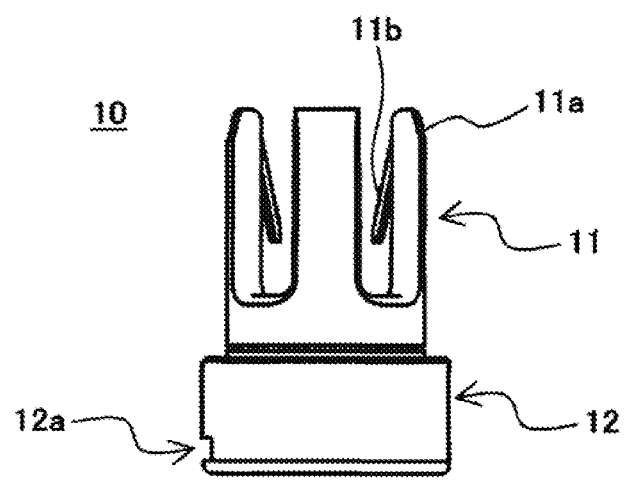

[FIG. 5]
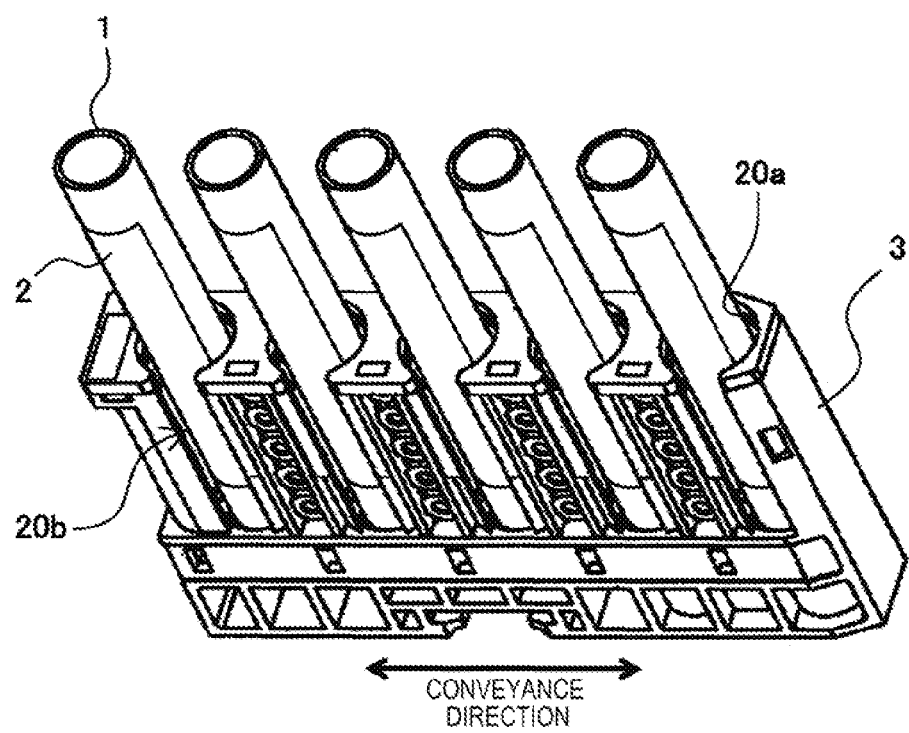

[FIG. 6]
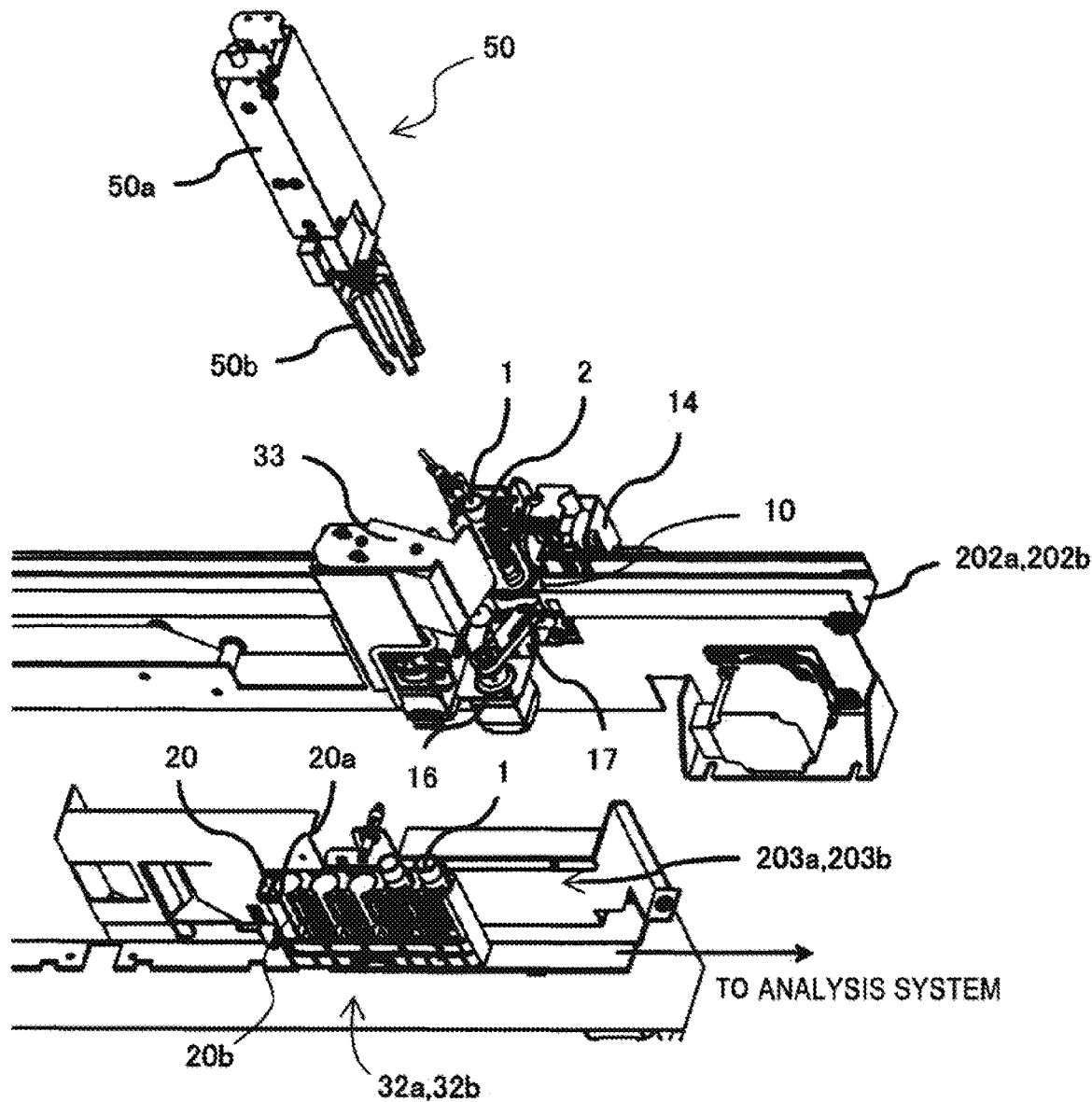

[FIG. 7]
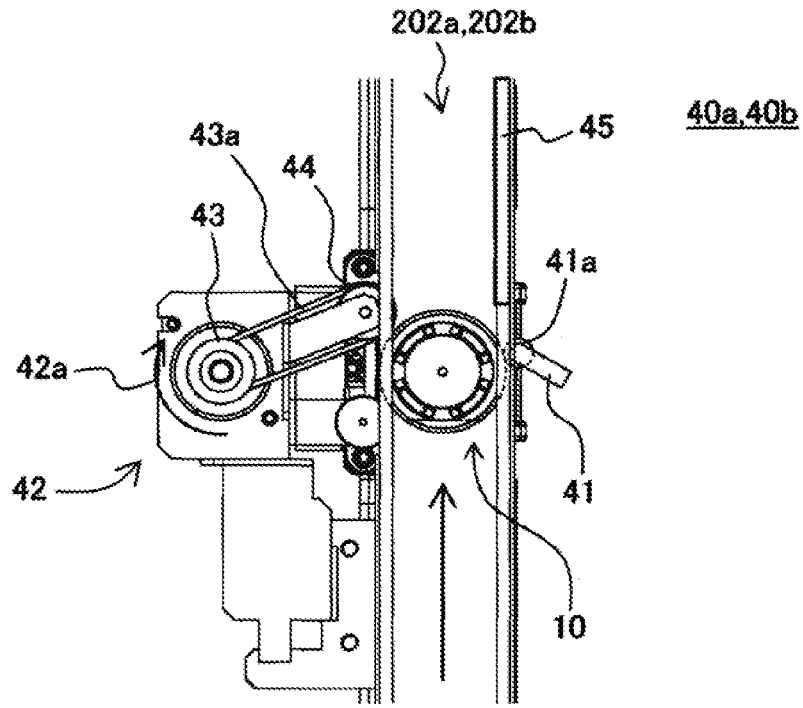
[FIG. 8]
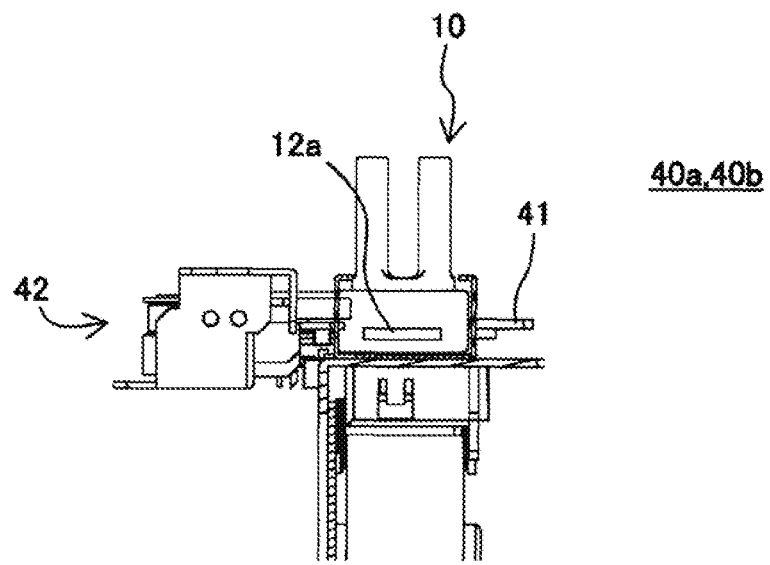

[FIG. 9]
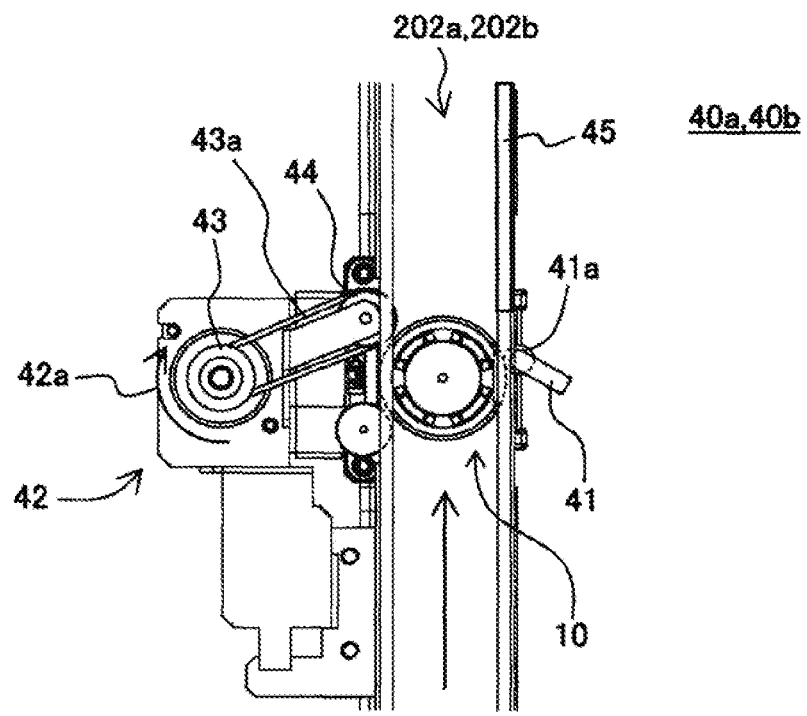
[FIG. 10]
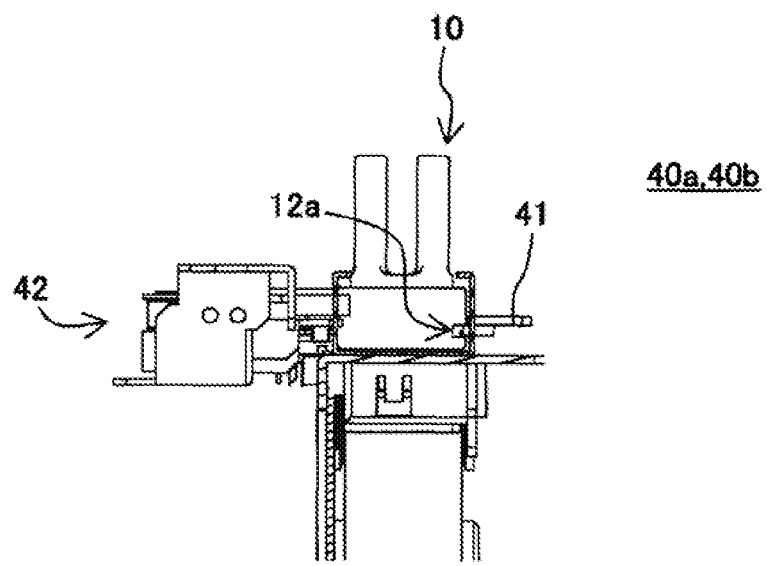

[FIG. 11]
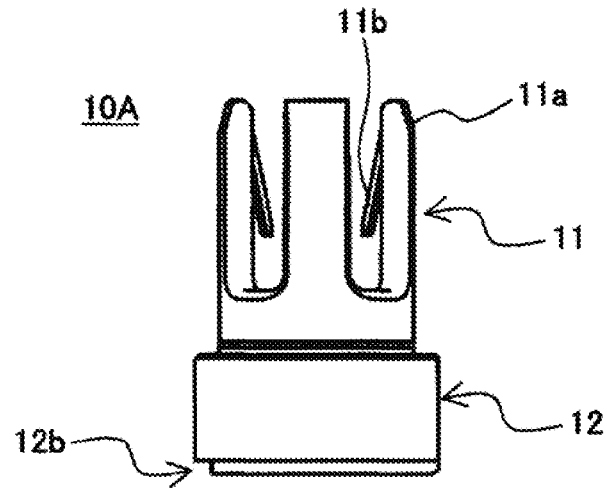
[FIG. 12]
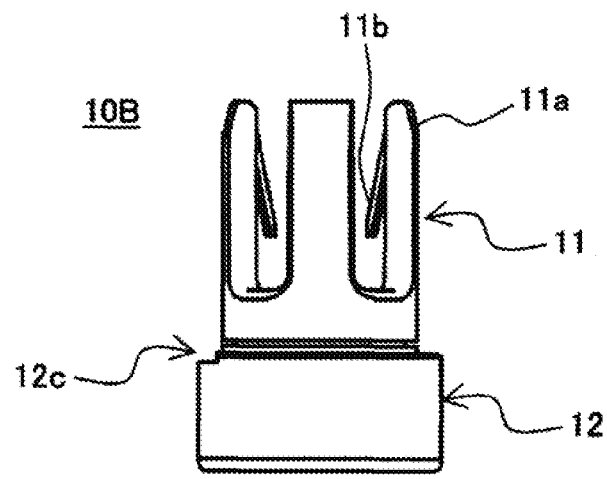

[FIG. 13]
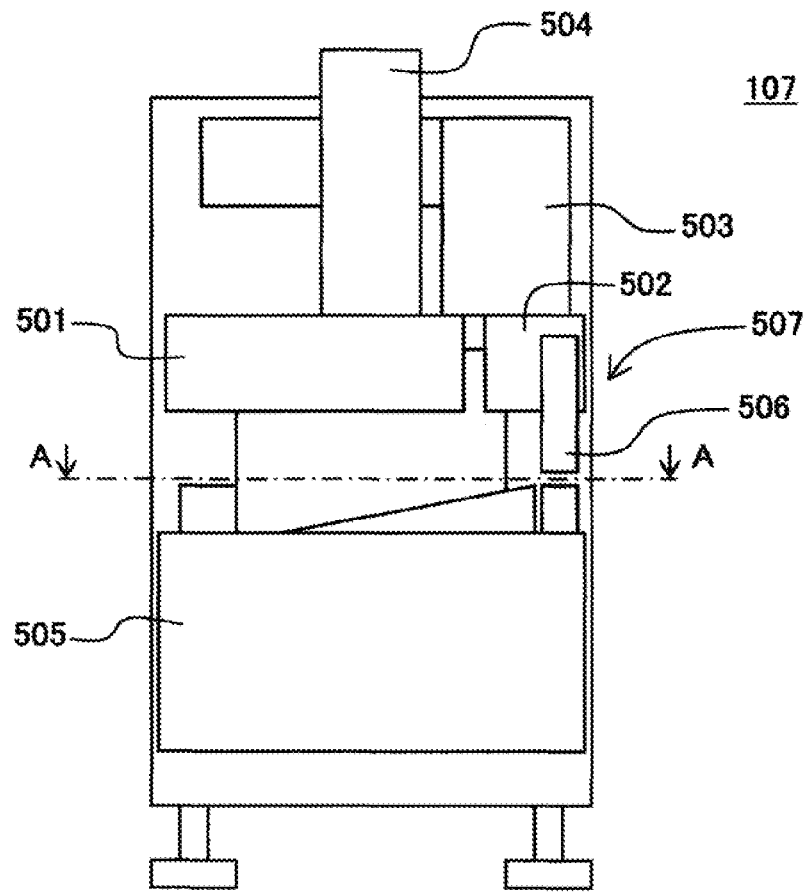
[FIG. 14]
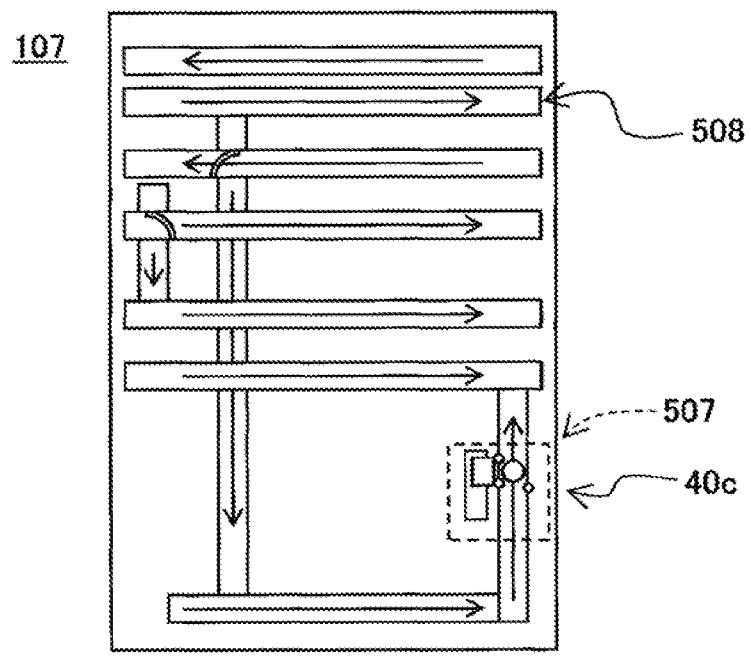

[FIG. 15]
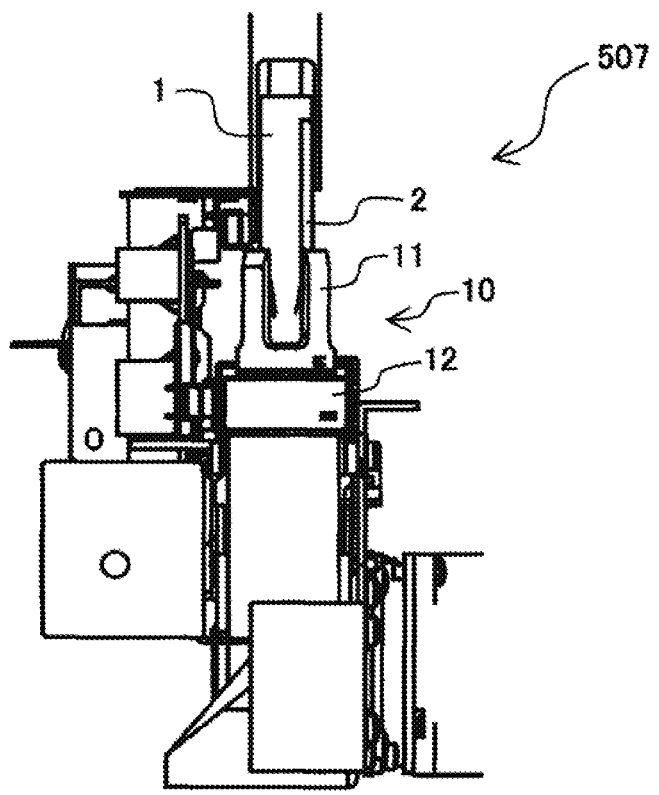

[FIG. 16]
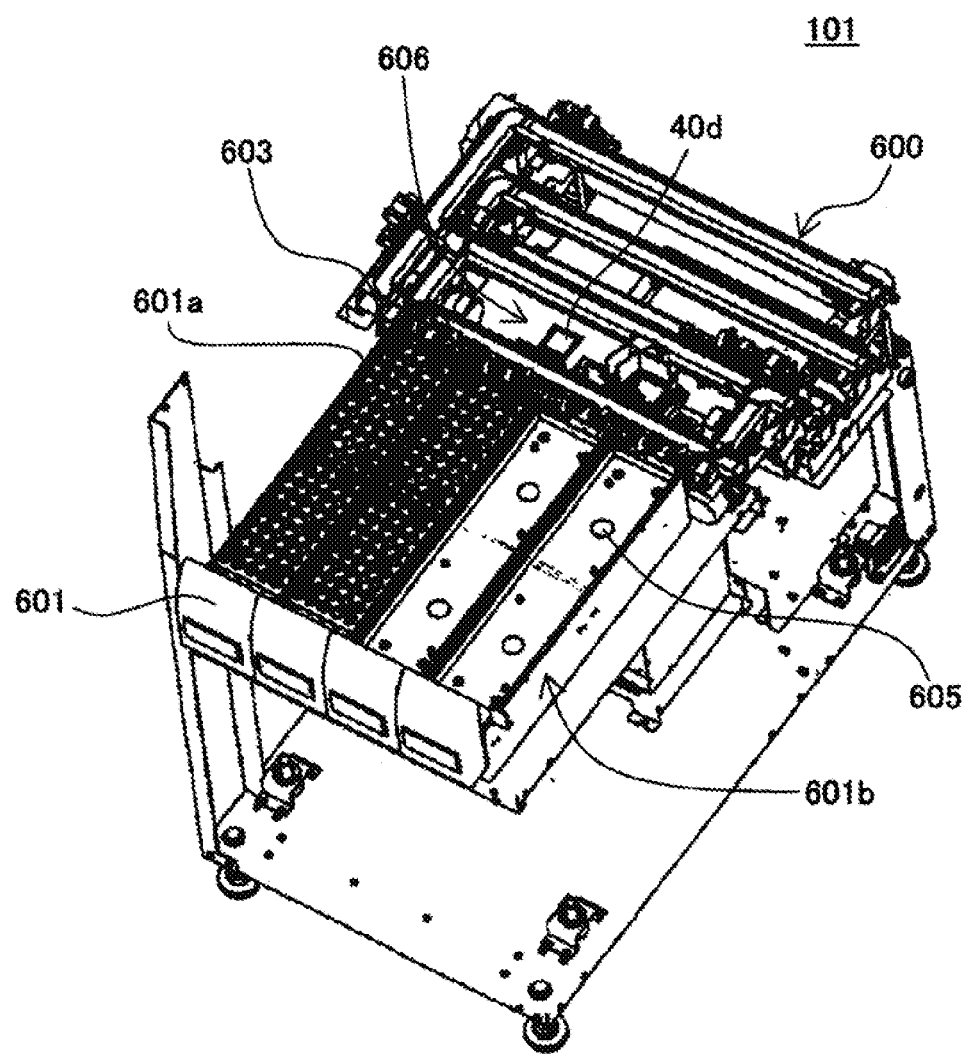

[FIG. 17]
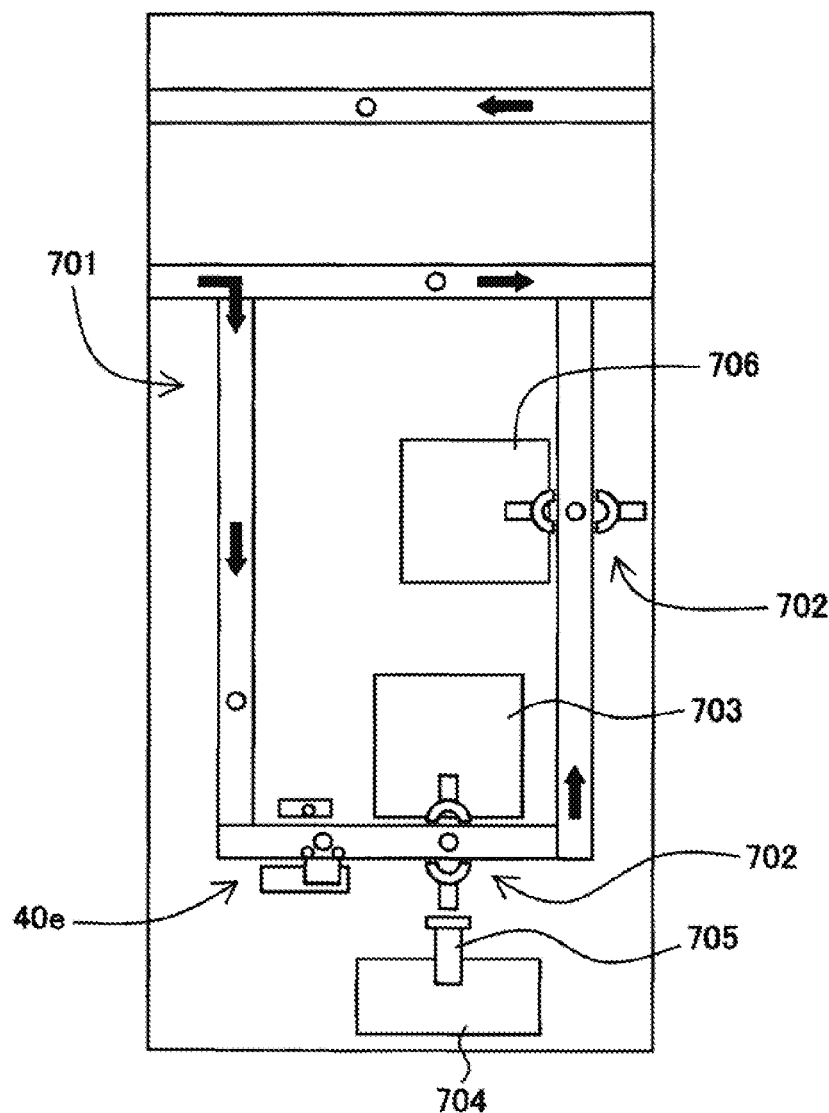

SPECIMEN INSPECTION AUTOMATION SYSTEM

TECHNICAL FIELD

The present invention relates to a specimen inspection automation system that performs qualitative and quantitative analysis of a specific component included in a specimen such as blood or urine.

BACKGROUND ART

In a specimen inspection automation system that performs qualitative and quantitative analysis of a specific component included in a biological specimen (hereinafter, referred to as "specimen") such as blood or urine, a pre-treatment of a specimen to be analyzable, an analysis of a specimen, and a conveyance process of conveying a specimen container between a pre-treatment device performing the pre-treatment and an analysis device performing the analysis are automatically performed.

As a technique relating to the conveyance of the specimen container, for example, PTL 1 (JP-A-2009-123679) discloses a specimen conveyance system including: a specimen container that contains a specimen; a specimen container holder that holds the specimen container; and a conveyance line where the specimen container holder is conveyed. The specimen container holder includes: a holder portion including a storage portion accommodating the specimen container; a base portion supporting the holder portion; and an adapter including a C-shaped portion molded for holding the specimen container included in the holder portion, and plural extension portions extending in a substantially perpendicular direction to the C-shaped portion, in which the extension portions are curved to face the center.

CITATION LIST

Patent Literature

PTL 1: JP-A-2009-123679

SUMMARY OF INVENTION

Technical Problem

The management of a specimen in a specimen inspection automation system is performed by reading an individual identification label such as a bar code or a QR (Quick Response) code formed on a specimen container containing the specimen using an optical reading device or the like.

When a specimen container is conveyed using a holder (specimen container holder) that holds one specimen container, the orientation of the specimen container holder changes due to friction during contact between the specimen container holder and a structure such as side walls of conveyance lines or a branch mechanism. Accordingly, when the individual identification label formed on the specimen container is read, an alignment work of the individual identification label with a reading position is necessary, and there is a problem that the reading process becomes complex.

In addition, in order to convey a specimen container in a specimen inspection automation system, not only a holder (specimen container holder) that holds one specimen container in the related art but also holders (specimen container rack) that hold plural specimen containers may also be used. If necessary, the specimen container holder and the specimen container rack may be selectively used to convey specimen containers. Individual identification information of specimen containers loaded on the specimen container rack is read through slits or the like provided on a side surface of the specimen container rack. Therefore, it is necessary to load the specimen containers on the specimen container rack such that the individual identification information is exposed at the position of the slit. Accordingly, when a specimen container is moved from the specimen container holder to the specimen container rack, it is necessary to appropriately adjust the orientation of the specimen container, and there is a problem that the moving process becomes complex.

The present invention has been made in consideration of the above-described circumstances, and the object thereof is to provide a specimen inspection automation system capable of appropriately adjusting the orientation of a specimen container in which a specimen is accommodated, and reducing work complexity.

Solution to Problem

In order to achieve the object according to the present invention, there is provided a specimen inspection automation system including: a pre-treatment device that pre-treats a specimen contained in a specimen container to be analyzable; an analysis device that analyzes the specimen pre-treated by the pre-treatment device; and a specimen conveyance device that conveys the specimen container between the pre-treatment device and the analysis device. The specimen inspection automation system includes holder orientation adjustment mechanisms adjusting the orientation of specimen container holders which each holds one specimen container having a print area of an identifier and a non-print area thereof on a side surface, the specimen container holder including a cylindrical base and a specimen container holder portion disposed on the base for holding the specimen container. The holder orientation adjustment mechanisms include: a stopper mechanism that is disposed above a conveyance line for conveying the specimen container holder by moving in a conveyance direction on a surface where the specimen container holder is placed and restricts the downstream movement of the specimen container holder by abutting, at the same height as a notched part provided on one side of a base of the specimen container holder, an outer circumferential part other than the notched part in the circumferential direction of the base; and a holder rotation mechanism restricts the movement of the specimen container holder away from the stopper mechanism and rotates the specimen container holder in the circumferential direction.

Advantageous Effects of Invention

According to the present invention, it is possible to appropriately adjust the orientation of a specimen container in which a specimen is accommodated and reduce work complexity.

BRIEF DESCRIPTION OF DRAWINGS

FIG. 1 is a diagram schematically illustrating an overall configuration of a specimen inspection automation system according to a first embodiment.

FIG. 2 is a top view schematically illustrating a configuration of a specimen container moving unit.

FIG. 3 is a perspective view illustrating a specimen container holder in a state where a specimen container is loaded thereon.

FIG. 4 is a side view illustrating the specimen container holder only.

FIG. 5 is a perspective view illustrating a specimen container rack on which specimen containers are loaded.

FIG. 6 is a perspective view schematically illustrating a moving mechanism at a movement position of a specimen container conveyance device.

FIG. 7 is a top view illustrating a state before adjusting the orientation of the specimen container holder.

FIG. 8 is a side view illustrating the state before adjusting the orientation of the specimen container holder.

FIG. 9 is a top view illustrating a state after adjusting the orientation of the specimen container holder.

FIG. 10 is a side view illustrating the state after adjusting the orientation of the specimen container holder.

FIG. 11 is a diagram illustrating a specimen container holder according to a modification example of the first embodiment.

FIG. 12 is a diagram illustrating a specimen container holder according to another modification example of the first embodiment.

FIG. 13 is a side view schematically illustrating an identification information attachment unit according to a second embodiment.

FIG. 14 is a top view schematically illustrating the identification information attachment unit according to the second embodiment.

FIG. 15 is a diagram illustrating a specimen container supply portion extracted from the identification information attachment unit.

FIG. 16 is a perspective view schematically illustrating a specimen storage unit according to a third embodiment.

FIG. 17 is a top view schematically illustrating a serum information identification unit according to a fourth embodiment.

DESCRIPTION OF EMBODIMENTS

Embodiments of the present invention will be described with reference to the drawings.

First Embodiment

A first embodiment of the present invention will be described with reference to FIGS. 1 to 10.

FIG. 1 is a diagram schematically illustrating an overall configuration of a specimen inspection automation system according to the embodiment. In addition, FIG. 2 is a top view schematically illustrating a configuration of a specimen container moving unit.

In FIG. 1, the specimen inspection automation system is schematically configured to include: a pre-treatment device 100 that pre-treats a biological specimen (hereinafter, referred to as "specimen") such as blood or urine contained in a specimen container 1 to be analyzable; analysis devices 300 and 301 that perform qualitative and quantitative analysis on a specific component included in the specimen pre-treated by the pre-treatment device 100; a specimen conveyance device 200 that conveys the specimen container 1 between the pre-treatment device 100 and the analysis devices 300 and 301; and a control device 400 that controls an overall operation of the specimen inspection automation system. The control device 400 has not only the function of controlling the overall operation of the specimen inspection automation system but also a function as a storage unit that stores specimen information such as analysis items or priority information of the specimen contained in the specimen container to be loaded on the specimen inspection automation system, the correspondence between each specimen and an individual identification label 2 attached to the specimen container 1, and the like.

The pre-treatment device 100 has a configuration in which the plural units having various functions required for the pre-treatment are linked to each other, and includes: a specimen loading unit 102 for loading the specimen container 1 containing the specimen on the specimen inspection system; a centrifugal separation unit 103 that performs centrifugal separation on the specimen of the specimen container 1; a serum information identification unit 104 that identifies serum information of the specimen container 1; a cover opening unit 105 that opens and closes a cover of the specimen container 1; a dispensing unit 107 that dispenses the specimen from the specimen container 1 to a sub specimen container 1a (hereinafter, collectively refer to as "specimen container 1" when it is not necessary to distinguish the specimen container 1 and the sub specimen container 1a); an identification information attachment unit 106 that attaches the individual identification label 2 (refer to FIG. 3 below or the like) such as a bar code or a QR (Quick Response) code to the sub specimen container 1a (specimen container 1); and a specimen storage unit 101 that accommodates and stores the specimen container 1 that predetermined treatments including the pre-treatment and the analysis have been completed. The respective treatment units 101 to 107 of the pre-treatment device 100 are connected through a conveyance line 202 constituting the specimen conveyance device 200, and the specimen container 1 is conveyed between the respective treatment units 101 to 107 through the conveyance line 202. The unit configuration of the pre-treatment device 100 according to the embodiment is merely exemplary, and the pre-treatment device 100 may be configured by units having other functions.

The analysis devices 300 and 301 perform qualitative and quantitative analysis on the specific component included in the specimen, and various automatic analysis devices such as a biochemical analysis device, an immunoassay analysis device, or a coagulation analysis device may be connected according to the use of the specimen inspection system.

The specimen conveyance device 200 conveys the specimen container holder 10 (refer to FIGS. 3 and 4 below or the like) or a specimen container rack 20 (refer to FIG. 5 below or the like) that holds the specimen container 1 in the specimen inspection system, and is schematically configured to include: the conveyance line 202 as a main line that is connected to the pre-treatment device 100; a conveyance line 203 that connects the analysis devices 300 and 301 disposed along the conveyance line 202, and the conveyance line 202; and a specimen container conveyance device 201 that is provided between the conveyance line 202 and the conveyance line 203, and moves the specimen container 1 between the specimen container holders 10 conveyed through the conveyance line 202 and the specimen container rack 20 conveyed through the conveyance line 203. In addition, each of the conveyance lines according to the embodiment conveys the specimen container holder 10 or the specimen container rack 20 disposed on an upper surface of a belt line by driving the belt line in a conveyance direction using a driving mechanism which is not illustrated.

As illustrated in FIG. 2, the specimen container conveyance device 201 includes: conveyance lines 202a and 202b (first conveyance line) where the specimen container holders 10 are conveyed; conveyance lines 203a and 203b (second conveyance line) where the specimen container rack 20 holding plural (for example, five) specimen containers 1 is conveyed; a moving mechanism 50 that moves the specimen container 1 between the specimen container holders 10 conveyed through the conveyance lines 202a and 202b, and the specimen container rack 20 conveyed through the conveyance lines 203a and 203b; and holder orientation adjustment mechanisms 40a and 40b disposed upstream of movement positions 30a and 30b by the moving mechanism 50 of the conveyance lines 202a and 202b of the specimen container 1. In addition, at each of movement positions 30a, 30b, 32a, and 32b, an optical reading device 33 that optically reads the individual identification label 2 attached to the side surface of the specimen container 1 is disposed.

Regarding the specimen container holder 10 where the specimen container 1 conveyed from the pre-treatment device 100 or other analysis devices 300 and 301 is loaded, the orientation thereof is adjusted to a predetermined orientation by the holder orientation adjustment mechanism 40a disposed at a holder orientation adjustment position 31a on the conveyance line 202a branched from the conveyance line 202. The specimen container holder 10 stops at the movement position 30a disposed downstream of the holder orientation adjustment position 31a, the specimen container 1 is conveyed by the moving mechanism 50 to the specimen container rack 20 that has been stopped at the movement position 32a on the conveyance line 203a, and the specimen container rack 20 where the specimen container 1 is loaded is conveyed to the analysis devices 300 and 301 side. In addition, regarding the empty specimen container holder 10 from which the specimen container 1 is moved at the movement position 30a, the orientation thereof is adjusted to a predetermined orientation by the holder orientation adjustment mechanism 40b disposed at a holder orientation adjustment position 31b on the conveyance line 202b returning from the conveyance line 202a to the conveyance line 202 side. The specimen container holder 10 stops at the movement position 30b disposed downstream of the holder orientation adjustment position 31b, the specimen container 1 is conveyed by the moving mechanism 50 from the specimen container rack 20 that has been stopped at the movement position 32b on the conveyance line 203b returning from the analysis devices 300 and 301, and the specimen container holder 10 where the specimen container 1 is loaded is conveyed to the other analysis devices 300 and 301 or the pre-treatment device 100.

FIG. 3 is a perspective view illustrating the specimen container holder in a state where the specimen container is loaded thereon, and FIG. 4 is a side view illustrating the specimen container holder only. In addition, FIG. 5 is a perspective view illustrating a specimen container rack where specimen containers are loaded.

In FIGS. 3 and 4, the specimen container holder 10 includes: a cylindrical base 12; and a specimen container holder portion 11 that is disposed on the base 12 and holds the specimen container 1. The specimen container holder portion 11 is formed to protrude upward from the base 12 and includes: plural pillars 11a that are disposed with a distance in the circumferential direction; and plate spring-shaped support members 11b that protrude inward from the pillars 11a in an obliquely downward direction. The specimen container 1 is supported from the side surface thereof using the support members 11b. The support members 11b are formed to be bent when pressed from the side surface of the specimen container 1. Even specimen containers 1 having different outer diameters can be loaded on the specimen container holder 10.

In addition, a notched part 12a is provided on one side of the base 12 of the specimen container holder 10. The notched part 12a of the specimen container holder 10 is provided in a horizontal direction with respect to the side surface of the base 12, and is formed such that the size of the base 12 in the radial direction at the height of the notched part 12a varies between positions with and without the notched part 12a in the circumferential direction. That is, the size of the base 12 in the radial direction when seen from the notched part 12a is smaller than the diameter of the base 12 by the depth of the notched part 12a.

For example, the individual identification label 2 (identifier) such as a bar code or a QR (Quick Response) code is attached to the side surface of the specimen container 1 to be loaded on the specimen container holder 10, and a print area of an identifier and a non-print area thereof are formed on the side surface of the specimen container 1. The individual identification label 2 attached to the side surface of the specimen container 1 loaded on the specimen container holder 10 can be optically read by the optical reading device 33 through a gap between the pillars 11a disposed with a distance.

In FIG. 5, the specimen container rack 20 is conveyed in a state where plural (for example, five) specimen containers 1 are loaded thereon, and is formed to extend in the conveyance direction along the conveyance lines 203 (203a and 203b). The plural (five) specimen container holder portions 20a that each has a vertical hole shape that holds a specimen container 1 inserted thereinto from above are disposed at regular intervals in the conveyance direction. In the side surface of the specimen container rack 20, slits 20b connected to the vertical holes forming the respective specimen container holder portions 20a are provided along the specimen container holder portions 20a in the vertical direction. The individual identification label 2 attached to the side surface of the specimen container 1 loaded on the specimen container rack 20 can be optically read by the optical reading device 33 through the slit 20b.

FIG. 6 is a perspective view schematically illustrating the moving mechanism at a movement position of the specimen container conveyance device.

In FIG. 6, the moving mechanism 50 of the specimen container conveyance device 201 moves the specimen containers 1 between the specimen container holder 10 and the specimen container rack 20 at the movement positions 30a, 30b, 32a, and 32b, and includes: a chuck portion 50a that includes plural fingers 50b at the lower tip; and a driving mechanism (not illustrated) that moves the chuck portion 50a in the up-down direction and the horizontal direction. The driving mechanism has a driving range where the chuck portion 50a is movable in a range including at least the movement positions 30a, 30b, 32a, and 32b.

When the specimen container 1 is moved from the specimen container holder 10 to the specimen container rack 20, the specimen container holder 10 that has arrived at the movement position 30a of the conveyance line 202a is stopped by a stopper 14, and the individual identification label 2 attached to the specimen container 1 is read by the optical reading device 33. When the individual identification label 2 of the specimen container 1 is not present in a readable range of the optical reading device 33 at the movement position 30a, the individual identification label 2 attached to the specimen container 1 is read by rotating the specimen container holder 10 using the holder rotation mechanism 17 to be driven by a motor 16. Next, the chuck portion 50a of the moving mechanism 50 moves to a region immediately above the specimen container 1 of the movement position 30a. The chuck portion 50a lowers, chucks the specimen container 1 with the fingers 50b, and lifts up to a sufficient height having no interfere with other structures. Next, the specimen container 1 is moved to a region immediately above the movement position 32a of the conveyance line 203a, and is inserted into the empty specimen container holder portion 20a in the specimen container rack 20a stopped at the movement position 32a.

The specimen container rack 20 is moved in the conveyance direction by a distance corresponding to one specimen container holder portion 20a, and the next empty specimen container holder portion 20a is moved to an insertion position of the specimen container 1 by the moving mechanism 50. When the specimen containers 1 are moved to all the specimen container holder portions 20a of the specimen container rack 20 or when the next specimen container 1 is not moved for a certain period of time, the specimen container rack 20 is conveyed to the analysis devices 300 and 301 through the conveyance line 203a. In the analysis devices 300 and 301, in order to recognize the specimen contained in the specimen container 1 loaded on the conveyed specimen container rack 20, the individual identification label 2 is read by the optical reading device through the slit 20b of the specimen container rack 20, and matching with the specimen information read by the optical reading device 33 of the specimen container conveyance device 201 is checked.

In addition, the same shall be applied to a case where the specimen container 1 is moved from the specimen container rack 20 to the specimen container holder 10. The specimen container 1 is extracted by the chuck portion 50a from the specimen container rack 20 stopped at the movement position 32b of the conveyance line 203b, and the specimen container 1 is inserted into the specimen container holder portion 11 of the empty specimen container holder 10 that has been conveyed through the conveyance line 202b and stopped by the stopper 14. At this time, the individual identification label 2 that is attached to the specimen container 1 loaded on the specimen container holder 10 is read by the optical reading device 33. Next, the specimen container holder 10 is conveyed to the other analysis devices 300 and 301 or the pre-treatment device 100 through the conveyance line 202b.

FIGS. 7 to 10 are diagrams describing a configuration and an operation of the holder orientation adjustment mechanisms. FIGS. 7 and 8 are diagrams illustrating a state before adjusting the orientation of the specimen container holder, and FIGS. 9 and 10 are diagrams illustrating a state after adjusting the orientation of the specimen container holder. FIGS. 7 and 9 are top views of the holder orientation adjustment mechanisms when seen from above, and FIGS. 8 and 10 are side views of the holder orientation adjustment mechanisms when seen from an upstream side in the conveyance direction. In addition, in FIGS. 7 to 10, for simplicity of description, the specimen container holder 10 without loading the specimen container 1 is shown.

In FIGS. 7 to 10, the holder orientation adjustment mechanisms 40a and 40b include: a stopper mechanism 41 that is disposed above each of the conveyance lines 202a and 202b for conveying the specimen container holder 10 by moving in the conveyance direction on a surface where the specimen container holder 10 is placed and restricts the downstream movement of the specimen container holder 10 by abutting, at the same height as the notched part 12a provided on one side of the base 12 of the specimen container holder 10, the outer circumferential part other than the notched part 12a in the circumferential direction of the base 12; and a holder rotation mechanism 42 that restricts the movement of the specimen container holder 10 away from the stopper mechanism 41 and rotates the specimen container holder 10 in the circumferential direction. In addition, at positions in contact with the downstream sides of the holder orientation adjustment mechanisms 40a and 40b in the conveyance lines 202a and 202b, a guide member 45 that guides the movement of the notch portion 12a of the base 12 of the specimen container holder 10 to be conveyed through the conveyance lines 202a and 202b is disposed on the stopper mechanism 41 side along the conveyance lines 202a and 202b. At the position of a tip of the stopper mechanism 41 in contact with the specimen container holder 10, a bearing function portion 41a for reducing a contact resistance generated between the stopper mechanism 41 and the specimen container holder 10 is provided. The bearing function portion 41a is, for example, a roller member rotating in a horizontal direction or a member having a curved surface such as a cylindrical shape or a spherical shape.

By rotating a driving roller 44 through a driving belt 43 using a driving motor 43, the holder rotation mechanism 42 rotates the specimen container holder 10 in a state where the base 12 is in contact with the driving roller 44. The holder rotation mechanism 42 is configured such that the driving roller 44 is at a height as the base 12, and has a height different from that of the notched part 12a.

The stopper mechanism 41 is disposed at the same height as the notched part 12a of the base 12 of the specimen container holder 10. As illustrated in FIGS. 7 and 8, when the specimen container holder 10 before the adjustment of the orientation is conveyed, that is, the notched part 12a does not face the direction of the stopper mechanism 41, the stopper mechanism 41 comes into contact with the base 12 such that the conveyance of the specimen container holder 10 to the downstream side is restricted (stopped). The specimen container holder 10 stopped by the stopper mechanism 41 is rotated by the holder rotation mechanism 42 in the direction indicated by an arrow 42a.

As illustrated in FIGS. 9 and 10, the specimen container holder 10 is rotated by the holder rotation mechanism 42. Once the notched part 12a of the base 12 of the specimen container holder 10 reaches the orientation of the stopper mechanism 41, the stopper mechanism 41 passes through the notched part 12a. As a result, the restriction on the conveyance of the specimen container holder 10 is released, and the specimen container holder 10 is conveyed to the downstream side through the conveyance lines 202a and 202b.

In the conveyance lines 202a and 202b positioned downstream of the holder rotation mechanism 42 in the conveyance direction, the guide member 45 is disposed such that the orientation of the specimen container holder 10 does not change due to friction with side walls of the conveyance lines 202a and 202b during the conveyance from the holder orientation adjustment mechanisms 40a and 40b to the movement positions 30a and 30b. The guide member 45 is disposed at the same height as the stopper mechanism 41, and guides the downstream movement of the notched part 12a (an inner surface thereof) such that the orientation of the notched part 12a of the base 12 of the specimen container holder 10 does not change while the specimen container holder 10 is conveyed through the conveyance lines 202a and 202b.

The effects of the embodiment having the above-described configuration will be described.

The management of a specimen in a specimen inspection automation system is performed by reading an individual identification label such as a bar code or a QR (Quick Response) code formed on a specimen container containing the specimen using an optical reading device or the like. When a specimen container is conveyed using a holder (specimen container holder) that holds one specimen container holder, the orientation of the specimen container holder changes due to friction during contact between the specimen container holder and a structure such as side walls of conveyance lines or a branch mechanism. Accordingly, when the individual identification label formed on the specimen container is read, an alignment work of the individual identification label with a reading position is necessary, and there is a problem that the reading process becomes complex. In addition, in order to convey a specimen container in a specimen inspection automation system, not only a holder (specimen container holder) that holds one specimen container but also holders (specimen container rack) that hold plural specimen containers may also be used. If necessary, the specimen container holder and the specimen container rack may be selectively used to convey specimen containers. Individual identification information of specimen containers loaded on the specimen container rack is read through slits or the like provided on a side surface of the specimen container rack. Therefore, it is necessary to load the specimen containers on the specimen container rack such that the individual identification information is exposed at a position of the slit. Accordingly, when a specimen container is moved from the specimen container holder to the specimen container rack, it is necessary to appropriately adjust the orientation of the specimen container, and there is a problem that the moving process becomes complex.

On the other hand, in the embodiment, the specimen inspection automation system includes the holder orientation adjustment mechanisms 40a and 40b adjusting the orientation of specimen container holders 10 which each holds one specimen container 1 having a print area of an individual identification label 2 and a non-print area thereof on a side surface, the specimen container holder 10 including the cylindrical base 12 and the specimen container holder portion 11 disposed on the base 12 for holding the specimen container 1. The holder orientation adjustment mechanisms 40a and 40b include: the stopper mechanism 41 that is disposed above each of the conveyance lines 202a and 202b for conveying the specimen container holder 10 and restricts the downstream movement of the specimen container holder 10 by abutting, at the same height as the notched part 12a provided on one side of the base 12 of the specimen container holder 10, the outer circumferential part other than the notched part 12a in the circumferential direction of the base 12; and the holder rotation mechanism 42 restricts the movement of the specimen container holder 10 away from the stopper mechanism 41, and rotates the specimen container holder 10 in the circumferential direction. Therefore, it is possible to appropriately adjust the orientation of the specimen container in which a specimen is accommodated and reduce work complexity.

That is, in the specimen container holder 10 that is conveyed to the holder orientation adjustment mechanisms 40a and 40b, when a relative orientation between the notched part 12a of the specimen container holder 10 and the position where the individual identification label 2 is attached to the specimen container 1 is uniform, the orientation of the specimen container holder 10 (that is, the orientation of the individual identification label 2) is also adjusted by adjusting the orientation of the specimen container holder 10 (that is, the orientation of the notched part 12a) using the holder orientation adjustment mechanisms 40a and 40b.

Accordingly, at the movement positions 30a and 30b to which the specimen container holder 10 is conveyed through the holder orientation adjustment mechanisms 40a and 40b, the individual identification label 2 of the specimen container 1 is conveyed in a predetermined orientation. Therefore, by disposing the optical reading device 33 in advance in the predetermined direction, the rotating operation using the holder rotation mechanism 17 is not necessary. As a result, the device configuration can be simplified, and the moving efficiency of the specimen container 1 can be improved. The specimen container holder 10 is formed such that the orientation of the pillars 11a is uniform with respect to the orientation of the notched part 12a, that is, the orientations of the pillars 11a and the individual identification label 2 do not overlap. As a result, the individual identification label 2 can be prevented from being damaged by the support member 11b.

In addition, the orientation of the specimen container holder 10 at the movement positions 30a and 30b is uniform. Therefore, when the specimen container 1 is conveyed using the moving mechanism 50, the orientation of the individual identification label 2 of the specimen container 1 can be recognized all the times. That is, when the specimen container 1 is conveyed from the specimen container holder 10 to the specimen container rack 20, the conveyance can be easily performed in consideration of the orientation of the specimen container 1, for example, as illustrated in FIG. 6, by matching the orientation of the specimen container 1 at the movement position 30a to the orientation of the slits 20b of the specimen container rack 20 at the movement position 32a. In addition, when the specimen container 1 is conveyed from the specimen container rack 20 to the specimen container holder 10, the conveyance can be easily performed such that the orientation of the specimen container holder 10 and the orientation of the specimen container 1 are uniform.

Modification Example of First Embodiment

A modification example of the first embodiment of the present invention will be described with reference to FIGS. 11 and 12.

In the modification example, the position of the notched part of the specimen container holder 10 is changed.

FIG. 11 is a side view illustrating a modification example of the specimen container holder loading the specimen container, and FIG. 12 is a side view illustrating another modification example thereof. In the drawings, components identical to those of the first embodiment are represented by the same reference numerals, and the description thereof will be omitted.

In FIG. 11, a specimen container holder 10A includes: the cylindrical base 12; and the specimen container holder portion 11 that is disposed on the base 12 and holds the specimen container 1. A notched part 12b is provided on one side of the base 12 of the specimen container holder 10A. The notched part 12b is disposed at a lower end of the base 12. When the specimen container holder 10A is used, the specimen container holder 10A is disposed such that the height of the stopper mechanisms 41 of the holder orientation adjustment mechanisms 40a and 40b also matches with the height of the notched part 12b.

In addition, as illustrated in FIG. 12, a specimen container holder 10B includes: the cylindrical base 12; and the specimen container holder portion 11 that is disposed above the base 12 and holds the specimen container 1. A notched part 12c is provided on one side of the base 12 of the specimen container holder 10B. The notched part 12c is disposed at an upper end of the base 12. When the specimen container holder 10B is used, the specimen container holder 10B is disposed such that the height of the stopper mechanisms 41 of the holder orientation adjustment mechanisms 40a and 40b also matches with the height of the notched part 12c.

The other configurations are the same as those in the first embodiment.

Even in the modification examples configured as described above, the same effects as those in the first embodiment can be obtained.

Second Embodiment

A second embodiment of the present invention will be described with reference to FIGS. 13 to 15.

In the second embodiment, the holder orientation adjustment mechanisms according to the first embodiment are applied to the identification information attachment unit.

FIG. 13 is a side view schematically illustrating the identification information attachment unit, and FIG. 14 is a top view thereof. In addition, FIG. 15 is a diagram illustrating a specimen container supply portion extracted therefrom. In the drawings, components identical to those of the first embodiment are represented by the same reference numerals, and the description thereof will be omitted.

In FIGS. 13 and 14, the identification information attachment unit 106 is schematically configured to include: a bar code printer 501 that issues a bar code label on which a bar code as an example of the individual identification label 2 is printed; a label attaching mechanism 502 that attaches the bar code label to the sub specimen container 1a (specimen container 1); a specimen container supply mechanism 503 that supplies the specimen container 1 to the label attaching mechanism 502; a conveyance line group 508 that is configured by plural conveyance lines. A scraping mechanism 504 scrapes the specimen container 1 from a specimen container hopper portion 505 to supply to the specimen container supply mechanism 503. Next, the bar code label is attached to the specimen container 1 by the label attaching mechanism 502. The specimen container 1 with the bar code label attached thereto is loaded on the empty specimen container holder 10, that is stopped at a loading position 507 by a pressing mechanism 506, and is conveyed to the next treatment unit (for example, the dispensing unit) through the conveyance line group 508. At the loading position 507, a holder orientation adjustment mechanism 40c having the same configuration as that of the holder orientation adjustment mechanisms 40a and 40b is disposed.

In the label attaching mechanism 502, the position of the bar code label attached to the specimen container 1 is uniform, and the orientation of the bar code (individual identification label 2) of the specimen container 1 that is supplied from the label attaching mechanism 502 to the specimen container holder 10 along a specimen installation guide 510 constituting a part of the pressing mechanism 506 is also made to be uniform. That is, if the orientation of the specimen container holder 10 is adjusted and waits such that the orientation of the bar code label faces a gap between the pillars 11a of the specimen container holder 10, when the specimen container 1 is installed in the specimen container holder 10, the bar code label can be prevented from being hidden by the pillars 11a of the specimen container holder 10.

The other configurations are the same as those in the first embodiment.

Even in the second embodiment configured as described above, the same effects as those in the first embodiment can be obtained.

Third Embodiment

A third embodiment of the present invention will be described with reference to FIG. 16.

In the third embodiment, the holder orientation adjustment mechanisms according to the first embodiment are applied to the specimen storage unit.

FIG. 16 is a perspective view schematically illustrating the specimen storage unit. In the drawing, components identical to those of the first embodiment are represented by the same reference numerals, and the description thereof will be omitted.

In FIG. 16, the specimen storage unit 101 is schematically configured to include: a conveyance line group 600 configured by plural conveyance lines; a tray housing portion 601 (601a, 601b); a specimen tray 603; and a specimen moving mechanism (not illustrated). In the specimen tray 603, the specimen container 1 can be installed.

A state in which the specimen tray 603 is accommodated in the tray storage portion 601 is represented by 601a, and a state in which the specimen tray 603 is not accommodated in the tray storage portion 601 is represented by 601b. In addition, plural holes for accommodating the specimen are provided in the specimen tray 603. In the bottom of the tray storage portion 601, a sensor (identifier reading device) 605 is provided. In addition, although not illustrated in the drawing, an identifier is attached to the bottom of the specimen tray 603, and a mechanism of reading the identifier is performed using the sensor (identifier reading device) 605 upon the installation thereof. As the identifier, a one-dimensional bar code, a two-dimensional bar code, an RFID or the like is adopted. Using a specimen moving mechanism which is not illustrated, the specimen container 1 that is installed in the specimen container holder 10 stopped at a movement stand-by position 606 on the conveyance line group 600 is extracted and is moved to the hole for accommodating the specimen of the specimen tray 603. In addition, the tray storage portion 601 has a drawable structure, and the specimen tray 603 is exposed such that the single specimen container 1 or the specimen container 603 can be extracted by drawing the tray storage portion 601 using a drawing mechanism which is not illustrated. At the movement stand-by position 606, a holder orientation adjustment mechanism 40d having the same configuration as that of the holder orientation adjustment mechanisms 40a and 40b is disposed.

With the above-described configuration, the orientations of the specimen containers 1 in the specimen tray 603 are uniform. Even when it is desired to perform a treatment again on the specimen container 1 stored in the specimen tray 603 in the analysis device, when the specimen is moved from the specimen tray 603 to the specimen container holder 10, the specimen container 1 can be installed such that the individual identification label 2 is positioned between the pillars 11a of the specimen container holder 10.

The other configurations are the same as those in the first embodiment.

Even in the third embodiment configured as described above, the same effects as those in the first embodiment can be obtained.

Fourth Embodiment

A fourth embodiment of the present invention will be described with reference to FIG. 17.

In the fourth embodiment, the holder orientation adjustment mechanisms according to the first embodiment are applied to the serum information identification unit.

FIG. 17 is a top view schematically illustrating the serum information identification unit. In the drawing, components identical to those of the first embodiment are represented by the same reference numerals, and the description thereof will be omitted.

In FIG. 17, the serum information identification unit 104 is schematically configured to include: a conveyance line group 701 that is configured by plural conveyance lines; a clamping mechanism 702 that fixes the specimen container holder 10; a chuck rotation mechanism 703 that lifts and rotates the specimen container 1; a light source 704 that irradiates the specimen container 1 with light from a side thereof; an imaging mechanism 705 for identifying the color of the specimen contained in the specimen container 1 or acquiring the specimen information; and a scanning mechanism 706 that identifies the volume of the specimen contained in the specimen container 1.

In the serum information identification unit 104, a holder orientation adjustment mechanism 40e having the same configuration as that of the holder orientation adjustment mechanisms 40a and 40b is disposed immediately before the clamping mechanism 702 disposed in the conveyance line group 701. When the orientation of the specimen container holder 10 is adjusted by the holder orientation adjustment mechanism 40e such that the individual identification label 2 attached to the specimen container 1 is opposite to the imaging mechanism 705, the specimen can be identified immediately after the specimen container holder 10 arrives at the clamping mechanism 702, and the treatment time can be reduced.

The other configurations are the same as those in the first embodiment.

Even in the fourth embodiment configured as described above, the same effects as those in the first embodiment can be obtained.

The present invention is not limited to the embodiments and the examples and includes various modification examples and combinations thereof. That is, the embodiments have been described in detail in order to easily describe the present invention, and the present invention is not necessarily to include all the configurations described above.

REFERENCE SIGNS LIST

1: specimen container
1a: sub specimen container
2: individual identification label
10, 10A, 10B: specimen container holder
11: specimen container holder portion
11a: pillars
11b: support members
12: base
12a, 12b, 12c: notched part
14: stopper
16: motor
17: holder rotation mechanism
20: specimen container rack
20a: specimen container holder portion
20b: slits
30a, 30b, 32a, 32b: movement position
31a, 31b: adjustment position
33: optical reading device
40a, 40b, 40c, 40d, 40e: holder orientation adjustment mechanism
41: stopper mechanism
41a: bearing function portion
42: holder rotation mechanism
42a: arrow
43: driving motor
43a: driving belt
44: driving roller
45: guide member
50: moving mechanism
100: pre-treatment device
101: specimen storage unit
102: specimen loading unit
103: centrifugal separation unit
104: serum information identification unit
105: cover opening unit
107: dispensing unit
106: identification information attachment unit
200: specimen conveyance device
201: specimen container conveyance device
300, 301: analysis device
400: control device

The invention claimed is:

1. A specimen inspection automation system comprising:
a pre-treatment device that pre-treats specimens contained in a specimen containers;
an analysis device that analyzes the specimens pre-treated by the pre-treatment device;
a specimen conveyance device that conveys the specimen containers between the pre-treatment device and the analysis device;
a plurality of holder orientation adjustment mechanisms for adjusting the orientations of a plurality of specimen container holders, each of which holds one specimen container having a print area of an identifier and a non-print area on a side surface, each of the specimen container holders including a cylindrical base, a notched part provided on one side of the base, and a specimen container holder portion disposed on the base for holding the specimen containers; and
a conveyance line for conveying the specimen container holders by moving in a conveyance direction on a surface where the specimen container holders are placed,
wherein the holder orientation adjustment mechanisms include:
a stopper mechanism that is disposed above the conveyance line and configured to stop the downstream movement of the specimen container holders by abutting, at the same height as the notched part of the base of the specimen container holders, an outer circumferential part other than the notched part in a circumferential orientation of the base of the specimen container holders when the notched parts of the specimen container holders are not aligned with the stopper mechanism,
a holder rotation mechanism that, after the stopper mechanism stops a particular specimen container holder, restricts movement of the particular specimen container holder away from the stopper mechanism and rotates the particular specimen container holder in a circumferential direction until the notched part of the particular specimen container holder is aligned with the stopper mechanism, and a guide member that is disposed along the conveyance line to be adjacent to a downstream side of the holder orientation adjustment mechanisms and guides the movement of the notched parts of the bases of the specimen container holders that are conveyed through the conveyance lines, wherein a bearing function portion for reducing a contact resistance generated between the stopper mechanism and the particular specimen container holder is provided at a position of a tip of the stopper mechanism in contact with the particular specimen container holder.

2. The specimen inspection automation system according to claim 1, wherein the conveyance line has a plurality of sections including:

a first conveyance line section where the specimen container holders are conveyed, a second conveyance line section where a specimen container rack holding a plurality of specimen containers is conveyed, and a moving mechanism that is configured to move the specimen containers between the specimen container holders that are conveyed through the first conveyance line section and the specimen container rack that is conveyed through the second conveyance line section, and the holder orientation adjustment mechanisms are disposed upstream of movement positions of the specimen containers by the moving mechanism of the first conveyance line section.

3. The specimen inspection automation system according to claim 1, wherein the pre-treatment device includes an identification information attachment unit that is configured to attach labels printed with identifiers thereon to the print area of the side surface of the specimen containers, and the identification information attachment unit includes:

the conveyance line where an empty specimen container holder on which the specimen container is not loaded is conveyed, and a specimen container loading mechanism that is configured to load the specimen containers with the identifiers attached thereto on the specimen container holders at a specimen container loading position disposed on the conveyance line, and the holder orientation adjustment mechanisms are disposed upstream of the specimen container loading position of the conveyance line.

4. The specimen inspection automation system according to claim 1, wherein the pre-treatment device includes a specimen storage unit that is configured to accommodate the specimen containers, the specimen storage unit includes:

the conveyance line where the specimen container holders on which the specimen containers are is loaded is conveyed, a specimen container storage portion that is configured to accommodate the specimen containers as storage targets, and a moving mechanism that is configured to move the specimen containers between the specimen container holders and the specimen container storage portion at specimen container movement positions disposed on the conveyance line, and the holder orientation adjustment mechanisms are disposed upstream of the specimen container movement positions of the conveyance line.

5. The specimen inspection automation system according to claim 1, wherein the pre-treatment device includes a serum information identification unit that is configured to acquire serum information of the specimens contained in the specimen containers, the serum information identification unit includes:

the conveyance line where the specimen container holders on which the specimen containers are loaded is conveyed, a specimen container lifting mechanism that is configured to hold and lifts the specimen containers loaded on the specimen container holders from the specimen container holders at a serum information acquisition position disposed on the conveyance line, a light source that is configured to irradiate the specimen containers with light for measurement from a side of the specimen containers in a state where the specimen containers are lifted by the specimen container lifting mechanism, and an imaging mechanism that is configured to image the specimen containers, and the holder orientation adjustment mechanisms are disposed upstream of the serum information acquisition position of the conveyance line.

* * * * *